US010052680B2

(12) United States Patent
Retot et al.

(10) Patent No.: US 10,052,680 B2
(45) Date of Patent: Aug. 21, 2018

(54) GYPSUM COMPOSITION FOR REFRACTORY MOULDS

(71) Applicant: SAINT-GOBAIN PLACO, Suresnes (FR)

(72) Inventors: Helene Retot, Avignon (FR); Nathalie Petigny, Velleron (FR); Emmanuel Fourdrin, Velleron (FR); Stephane Thioliere, Gif sur Yvette (FR)

(73) Assignee: SAINT-GOBAIN PLACO, Suresnes (FR)

( * ) Notice: Subject to any disclaimer, the term of this patent is extended or adjusted under 35 U.S.C. 154(b) by 516 days.

(21) Appl. No.: 14/404,545

(22) PCT Filed: May 27, 2013

(86) PCT No.: PCT/FR2013/051169
§ 371 (c)(1),
(2) Date: Nov. 28, 2014

(87) PCT Pub. No.: WO2013/178923
PCT Pub. Date: Dec. 5, 2013

(65) Prior Publication Data
US 2015/0183023 A1    Jul. 2, 2015

(30) Foreign Application Priority Data
May 30, 2012 (FR) ...................... 12 54957

(51) Int. Cl.
| *B22C 1/00* | (2006.01) |
| *B22C 9/02* | (2006.01) |
| *B22C 1/18* | (2006.01) |
| *C04B 28/14* | (2006.01) |
| *C04B 111/00* | (2006.01) |

(52) U.S. Cl.
CPC ............... *B22C 1/00* (2013.01); *B22C 1/181* (2013.01); *B22C 9/02* (2013.01); *C04B 28/14* (2013.01); *C04B 28/146* (2013.01); *C04B 2111/00939* (2013.01)

(58) Field of Classification Search
CPC ....... C04B 14/06; C04B 28/14; C04B 14/024; C04B 14/303; C04B 28/146; C04B 14/323; C04B 20/0096; C04B 2111/00939; B22C 1/00; B22C 1/181; B22C 9/02
See application file for complete search history.

(56) References Cited

U.S. PATENT DOCUMENTS

| 4,814,011 | A | 3/1989 | Kamohara et al. |
| 5,769,933 | A * | 6/1998 | Landis ..................... B22C 1/00 106/38.2 |
| 6,013,125 | A | 1/2000 | Quraishi et al. |
| 8,029,711 | B2 * | 10/2011 | Grefhorst .................. B22C 1/02 106/38.27 |
| 2004/0083926 | A1 | 5/2004 | Mitkova et al. |
| 2005/0121168 | A1 * | 6/2005 | Grefhorst .................. B22C 1/18 164/520 |
| 2011/0036528 | A1 * | 2/2011 | Goebbert .................. B22C 1/14 164/23 |
| 2011/0281051 | A1 | 11/2011 | Dufaure et al. |

FOREIGN PATENT DOCUMENTS

| FR | 2 797 869 A1 | 3/2001 |
| GB | 2 198 125 | 6/1988 |
| WO | WO 02/081122 A2 | 10/2002 |

OTHER PUBLICATIONS

International Search Report dated Sep. 12, 2013, in PCT/FR13/051169 filed May 27, 2013.
Nandi A K, et al., "Experimental studies on equivalent thermal properties of particle-reinforced flexible mould materials", Engineering Information, Inc., XP002691766, vol. 112, 2010, 1 page.

* cited by examiner

*Primary Examiner* — Shuangyi Abu Ali
(74) *Attorney, Agent, or Firm* — Oblon, McClelland, Maier & Neustadt, L.L.P.

(57) ABSTRACT

The invention relates to a mineral composition for the preparation of foundry molds, comprising:
(a) from 20% to 90% by weight of plaster,
(b) from 10% to 80% by weight of a mineral component based on silica and/or alumina, and
(c) from 0.5% to 4.8%, preferably from 1.5% to 4.5% and in particular between 2% and 4.5% by weight, of a mineral powder having a thermal conductivity ($\lambda$), at 20° C., of greater than 15 W/(m·K) and a specific surface area of greater than 10 $m^2$/g,
these percentages being relative to the total weight of the sum of the components (a), (b) and (c).

17 Claims, No Drawings

GYPSUM COMPOSITION FOR REFRACTORY MOULDS

The present invention relates to plaster compositions, intended for the manufacture of refractory foundry moulds, containing an additive having a high thermal conductivity and a high specific surface area.

The lost wax foundry process is an ancient technique in which a refractory plaster mould is cast around a wax model. After curing the plaster, the wax is removed from the mould ("dewaxing" step) by heating. After firing and warming of the mould, the liquid metal is cast in the hollow left by the wax model.

Similar techniques use models based on elastomeric materials, for example based on silicone elastomer, which have the advantage of being reusable.

In order to obtain good quality moulded parts, which are free of defects, it is important for the cooling of the metal to be carried out as homogeneously as possible. Indeed, in particular for moulding parts comprising relatively thick sections, a premature solidification of the metal is often observed in the feed channel. The plug of solid metal thus formed cuts off the metal that is still liquid, inside the mould, from the bath of molten metal and prevents any compensation for the shrinkage of the part by an additional supply of metal.

The voids which then form at the core or at the surface of the metal part constitute defects that are known as "shrinkage cavities".

The casting of the molten metal must take place in a perfectly dry and generally preheated refractory mould. If the mould still contains wet regions, there is a risk of instantaneous evaporation of the residual water and formation of gas bubbles that create defects in the final part. The drying and preheating step is crucial and has quite a long duration, which is difficult to reduce, of several hours. For rapid drying of the mould, it is not only important for the temperature of the mould to be as homogenous as possible, but it is advisable to ensure that the material has an open microporosity enabling a good evacuation of the water in the form of vapour. The parameter commonly used to quantify this microporosity is the intrinsic permeability, determined in the manner described in the examples.

In order to prevent the formation of shrinkage cavities, it is known to increase the thermal conductivity of the moulds. Application FR 2845986 for example thus proposes increasing the alumina content of the plaster compositions by replacing some of the silica filler. This document does not however examine the aspects of the intrinsic permeability and the mould drying and warming time before casting.

Application CN101259514 discloses a process for preparing refractory moulds for the casting of metals. The composition contains from 20% to 35% of plaster powder, from 3.2% to 10% of quartz powder, from 50% to 60% of bauxite, from 4% to 10% of talc powder and from 1.5% to 5% of graphite powder, and also from 0.1% to 0.3% of glass fibres. This document mentions the shortening of the firing time of the mould.

Within the context of its research aiming to further improve the properties of the refractory moulds produced, the Applicant has discovered that it was possible to further shorten the firing time of the moulds and to promote the thermal homogeneity of the moulds before and after the casting of the metal, by using additives that are good thermal conductors having a high specific surface area. To the knowledge of the Applicant, the latter parameter has not thus far been taken into consideration during the choice of the ingredients of a moulding composition for refractory moulds.

The Applicant has in particular observed that the selection of additives having a high thermal conductivity and a high specific surface area made it possible to obtain, even for relatively low concentrations of additives, of less than 5% by weight, even shorter firing times than with additives having an equivalent thermal conductivity but a significantly smaller specific surface area.

In a first aspect, one subject-matter of the present invention is consequently a pulverulent mineral composition for the preparation of foundry moulds, comprising:
(a) from 20% to 90% by weight of plaster,
(b) from 10% to 80% by weight of a mineral component based on silica and/or alumina, and
(c) from 0.5% to 4.8% by weight of a mineral powder having a thermal conductivity ($\lambda$) at 20° C. of greater than 15 W/(m·K) and a specific surface area of greater than 10 $m^2/g$, these percentages being relative to the total weight of the sum of the components (a), (b) and (c).

In a second aspect, another subject-matter of the present invention is a pulverulent mineral composition for the preparation of foundry moulds, comprising:
(a) from 20% to 90% by weight of plaster,
(b) from 10% to 80% by weight of a mineral component based on silica and/or alumina, and
(c) from 0.5% to 4.8% by weight of a graphite powder, preferably a compacted or uncompacted expanded graphite powder, having a specific surface area of greater than 10 $m^2/g$, these percentages being relative to the total weight of the sum of the components (a), (b) and (c).

Another subject-matter of the present invention is the use of such a mineral composition for the manufacture of refractory foundry moulds, and more particularly a process for manufacturing a foundry mould, comprising:
 the mixing of a pulverulent mineral composition as defined above with water so as to obtain a fluid composition,
 the casting of the fluid composition in a mould containing a model of the part to be moulded,
 the setting of the mixed composition and, after complete curing,
 the removal of the model or separation of the model and of the mould obtained.

Still another subject-matter of the invention is a foundry mould obtainable by the process described above.

The ingredients (a) and (b) are materials conventionally used for the manufacture of refractory moulds and are described, for example, in application U.S. 2004/0256081.

The mineral component based on silica and/or alumina is preferably selected from the group formed by amorphous silica, crystalline silica such as quartz and cristobalite, alumina, cordierite and refractory chamottes based on mullite, quartz being a particularly preferred component (b). Use will preferably be made of fine powders having a particle size such that the mean size of the particles is less than 1 mm, preferably less than 0.5 mm and in particular less than 200 μm.

The component (b) is preferably used in a proportion of from 30% to 75%, in particular in a proportion of from 40% to 70% by weight, relative to the total weight of the sum of components (a), (b) and (c). Component (b) is advantageously in the majority relative to component (a). This is because the less plaster the composition contains, the less water it will require and the faster the drying will be.

However, a sufficient amount of plaster (binder) will be required in order to give the moulds a sufficient mechanical strength.

As explained in the introduction, component (c) must have both a high thermal conductivity and a high specific surface area.

The thermal conductivity at 20° C. is determined in accordance with the standard ISO 8894 on a solid sample of the ingredient (c).

The thermal conductivity ($\lambda$) at 20° C. of the mineral powder (c) is advantageously between 20 and 500 W/(m·K).

Mention may be made, as examples of materials having suitable thermal conductivities, of graphite, zinc oxide, carbides of silicon, boron, zirconium or tungsten, nitrides of titanium, aluminium, gallium or indium, and the metals selected from nickel, iron and copper. Among these, graphite (24 W/mK), silicon carbide (490 W/(mK)), and the metals selected from nickel (90 W/(mK)), iron (80 W/(mK)) and copper (400 W/(mK)), and in particular silicon carbide and graphite, are preferred.

It is possible to find other mineral materials that have suitable conductivities in published tables, for example, in the Handbook of Chemistry and Physics.

The specific surface area of component (c) is determined in a known manner according to the BET method by nitrogen adsorption. It is preferably between 12 and 50 m$^2$/g, in particular between 15 and 40 m$^2$/g and ideally between 20 and 30 m$^2$/g.

The median diameter ($D_{50}$) of the particles of the mineral powder (c), determined by laser particle size analysis, is advantageously greater than 1 μm, preferably between 2 and 500 μm, more preferably between 5 and 250 μm, more preferably still between 10 and 200 μm and in particular between 20 and 150 μm.

Finally, the mineral powder forming component (c) advantageously has a bulk density of between 0.02 and 0.3 g/cm$^3$, in particular between 0.03 and 0.2 g/cm$^3$.

In one particularly preferred embodiment of the present invention, component (c) is expanded graphite or recompressed expanded graphite, or a mixture thereof.

The manufacture of expanded graphite is described, for example, in EP1491497, and expanded graphites are sold, for example, under the name "ABG" by the company Superior Graphite, under the name "Expanded Graphite Powder" by the company Handan Universe New Building Ltd., and under the name "Expanded Graphite" by the company Kaiyu Industrial Ltd.

Recompressed expanded graphite, also known as compacted expanded graphite, is sold under the name "Ecophit® G" by the company SGL Group—The Carbon Company.

Its use in plasterboards intended for the construction industry is described, for example, in application U.S. 2007/0031704. In this document, compacted expanded graphite is used at a concentration between 5% and 50% by weight in order to increase the thermal conductivity of the boards. The lower limit of this range is considered, in paragraph [0061] of this document, to be located below the percolation threshold, estimated at around 10% to 15%. Considering the teaching of this prior art document, the Applicant was surprised to observe that, at concentrations significantly below this percolation threshold, the presence of expanded graphite and/or of compacted expanded graphite increased not only the diffusivity of the refractory moulds prepared, but enabled a significant shortening of the drying and warming time of the moulds, as will be demonstrated below in the examples.

Component (c), and in particular compacted or uncompacted expanded graphite, is preferably used in the compositions of the present invention in a proportion of from 1.5% to 4.5% by weight, in particular from 2% to 4.5% by weight.

The composition of the present invention may contain, in addition to components (a), (b) and (c), up to 30% by weight, relative to the total weight of components (a)+(b)+(c), of one or more other mineral additives (component (d)), different from the ingredients (a), (b) and (c). These additives are preferably selected from the group formed by expanded or to unexpanded glass beads, glass flakes, mineral fibres and vermiculite, preferably from the group formed by expanded glass beads and glass fibres.

Finally, the composition of the invention may of course contain various functional additives such as setting retardants, setting accelerators, fluidized agents, thickeners, wetting agents, water-repellent agents such as silicones or waxes, agents limiting the expansion during setting, deformation inhibitors, anti-foaming agents, anti-settling agents, foaming agents, foam stabilizers, bactericides, fungicides, agents for adjusting the pH or colouring agents.

During the preparation of the refractory moulds, all of the ingredients are mixed with a suitable amount of water. This amount of water is advantageously such that the water/solids weight ratio is between 0.2 and 0.6, preferably between 0.3 and 0.5.

This fluid preparation is cast in a vessel containing the model of the part to be moulded. This model is conventionally made of wax (lost wax process), but it is equally possible to use models made of elastomer, for example made of silicone, which may be removed from the mould after the curing thereof and reused.

The cured and demoulded composition is advantageously left to crystallize by leaving it to rest under ambient conditions for a time at least equal to around 2 hours, preferably between 2 and 4 hours. At the end of this crystallization step, it is placed in an oven, which is preferably ventilated and thermostatically controlled at a temperature generally between 200° C. and 800° C., preferably between 200° C. and less than 600° C.

The firing (drying and warming) time depends of course on the size and compactness of the moulds. The larger and more compact the moulds, the more advisable it is to increase the firing time. It can of course be envisaged to proceed via temperature ramps.

The removal of the model may take place either at the end of the crystallization step, when it is for example a model made of silicone, or during the firing step when it is for example a model made of wax.

Owing to the presence of an additive that is a good thermal conductor and has a high specific surface area as described above, the foundry mould prepared in this manner advantageously has a thermal diffusivity at ambient temperature of between 0.2 and 2 mm$^2$/s, preferably between 0.3 and 1.5 mm$^2$/s, and in particular between 0.7 and 1.2 mm$^2$/s.

The casting of the metal is preferably carried out immediately after the end of the firing on the hot mould.

The cooling of the mould after casting may take place by simple resting at ambient temperature, but it is also possible to envisage an active cooling or a combination of these two embodiments.

Owing to the high diffusivity of the mould, not only is the firing time of the refractory moulds shortened, but also the cooling time.

EXAMPLE

Five mineral compositions are prepared by mixing of the following ingredients:

TABLE 1

Amounts by weight and volume fractions of the ingredients of five mineral compositions for refractory moulds

|  | Composition A1 (invention) | Composition A2 (invention) | Composition B (comparative) | Composition C1 (comparative) | Composition C2 (comparative) |
|---|---|---|---|---|---|
| Extra-fine silica | 1000 g (44%) | 817 g (33%) | 864 g (37.4%) | 1034 g (45.5%) | 680 g (34%) |
| Fine silica | 470 g (20.5%) | 385 g (15.5%) | 406.5 g (17.6%) | 486 g (21.5%) | 320 g (16%) |
| Alpha plaster | 780 g (33%) | 1263 g (49%) | 792 g (33%) | 778 g (33%) | 1000 g (50%) |
| Ecophit® GFG50* | 48 g (2.5%) | — | — | — | — |
| Superfine expanded graphite** | — | 34 g (2.5%) | — | — | — |
| Graphite SLP50*** | — | — | 236 g (12%) | — | — |
| Total | 2300 g (100%) | 2500 g (100%) | 2300 g (100%) | 2300 g (100%) | 2000 g (100%) |

*Compressed expanded graphite powder sold by the company SGL Group - The Carbon Company (more than 95% carbon, median diameter ($D_{50}$) = 100 μm, specific surface area 20-25 $m^2/g$, bulk density 0.05-0.1 $g/cm^3$)
**(Non-compacted) expanded graphite powder sold by the company Handan Universe New Building Ltd., specific surface area 25 $m^2/g$
***Graphite powder sold by the company Timrex, median diameter ($D_{50}$) = 22 μm, specific surface area 3-7 $m^2/g$, bulk density 0.4 $g/cm^3$)

Each of these powders is mixed with an amount of water such that the water/plaster weight ratio is equal to 1.3. The fluid compositions obtained are cast in moulds of suitable shapes in order to obtain test specimens that are used for the characterization of the cured samples.

The drying time up to 200° C. is determined in the following manner:

Samples of frustoconical shape are prepared, by moulding, that have, at their base, a diameter of between 90 and 100 mm and a height of 120 mm. After curing the composition, the samples are demoulded and are left for 2 hours at ambient temperature. Next, they are placed in an oven thermostatically controlled at 250° C. A thermocouple at the centre of each sample makes it possible to continuously monitor the increase in w temperature. For each sample, the time needed to bring the core of the sample to a temperature of 200° C. is determined.

The thermal diffusivity is determined in the following manner: 40 mm×40 mm×15 mm samples are dried at 45° C. and painted black. Each sample is insulated at the edge (15 mm). One of the square faces is heated by a flash lamp and the thermal energy emitted by the opposite face is measured as a function of time using an infrared detector. The thermogram thus obtained makes it possible to calculate the diffusivity at ambient temperature by the Levenberg-Marquart method.

The intrinsic permeability is determined by measuring the gas permeability of the material, according to the standard ISO 8841:1991, for various pressures (P). The intrinsic permeability corresponds to the intersection of the graph Permeability=f(1/P) with the y-axis (1/P=0). The larger the intrinsic permeability, the more likely a rapid drying of the refractory mould.

The mean diameter of the pores is determined by mercury porosimetry.

Table 2 below shows the results of these characterizations for the two compositions according to the invention and the three comparative compositions from Table 1.

TABLE 2

|  | Composition A1 (invention) | Composition A2 (invention) | Composition B (comparative) | Composition C1 (comparative) | Composition C2 (comparative) |
|---|---|---|---|---|---|
| Drying time up to 200° C. (minutes) | 176 | 200 | 207 | 219 | 250 |
| Diffusivity at ambient temperature ($mm^2/s$) | 0.99 | 0.83 | 0.76 | ND* | 0.57 |
| Intrinsic permeability ($10^{-14}\ m^2$) | 6.5 | ND* | 3.4 | 7.7 | 3.3 |
| Mean pore diameter | 4.3 | ND* | 2.75 | ND* | 2.8 |

*not determined

It is observed that the two compositions (A1 and A2) according to the invention containing 2.5% by volume of a graphite powder having a high specific surface area give samples which can be dried much more rapidly than a sample obtained with a composition free of graphite powder (respectively compositions C1 and C2). The performances of the two samples according to the invention (A1 and A2) are also better than those obtained with a comparative composition (composition B) containing 12% by volume of a graphite powder having a relatively lower specific surface area.

It is also possible to observe that the presence of the comparative graphite (unexpanded graphite, median diameter ($D_{50}$)=22 μm, specific surface area 3-7 m²/g, bulk density 0.4 g/cm³) in composition B significantly reduces the intrinsic permeability of the mould relative to composition C1. The decrease in this intrinsic permeability is considerably smaller for composition A1 containing an expanded graphite.

The invention claimed is:

1. A mineral composition, comprising, relative to a total combined weight of components (a), (b), and (c):
    (a) from 33% to 89.5% by weight of plaster,
    (b) from 10% to 66.5% by weight of a mineral component based on silica and/or alumina, and
    (c) from 0.5% to 4.8% by weight of a mineral powder having a thermal conductivity (λ) at 20° C. from 15 to 500 W/(m·K) and a BET specific surface area from 10 to 50 m²/g, wherein the mineral powder is selected from the group consisting of graphite, zinc oxide, silicon carbide, boron carbide, zirconium carbide, tungsten carbide, titanium nitride, aluminium nitride, gallium nitride, indium nitride, nickel, iron, and copper,
    wherein the composition is suitable for preparation of a foundry mold.

2. The mineral composition according to claim 1, wherein the mineral powder (c) has a thermal conductivity (λ) at 20° C. of between 20 and 500 W/(m·K).

3. The mineral composition according to claim 1, wherein the mineral powder (c) is a graphite powder.

4. The mineral composition according to claim 1, wherein the median diameter ($D_{50}$) of the mineral powder (c), determined by laser particle size analysis, is between 5 and 250 μm.

5. The mineral composition according to claim 1, wherein the BET specific surface area of the mineral powder (c) is between 12 and 50 m²/g.

6. The mineral composition according to claim 1, wherein the mineral powder (c) has a bulk density of between 0.02 and 0.3 g/cm³.

7. The mineral composition according to claim 1, wherein the mineral component (b) based on silica and/or alumina is at least one component selected from the group consisting of silica, alumina, cordierite, and a refractory chamotte based on mullite.

8. The mineral composition according to claim 1, further comprising:
    at least one other additive selected from the group consisting of expanded glass beads, unexpanded glass beads, glass flakes, mineral fibers, and vermiculite,
    wherein the at least one other additive is present in an amount up to 30% relative to the total combined weight of components (a), (b), and (c).

9. A process for manufacturing a foundry mould, the process comprising:
    mixing the mineral composition according to claim 1 with water, thereby obtaining a fluid composition,
    casting the fluid composition in a mold comprising a model of a part to be moulded, thereby obtaining a casted composition,
    setting the casted composition and, after complete curing, removing the model or separating the model and the mold.

10. A foundry mold obtained by a process comprising the process of claim 9.

11. The foundry mold according to claim 10, wherein the mold has a thermal diffusivity at ambient temperature of between 0.2 and 2 mm²/s.

12. The mineral composition according to claim 1, comprising from 30% to 66.5% of the mineral component (b), relative to the total weight of the sum of components (a), (b) and (c).

13. The mineral composition according to claim 1, comprising from 40% to 66.5% of the mineral component (b), relative to the total weight of the sum of components (a), (b) and (c).

14. The mineral composition according to claim 1, comprising from 1.5% to 4.5% of the mineral powder (c), relative to the total weight of the sum of components (a), (b) and (c).

15. The mineral composition according to claim 1, comprising from 2% to 4.5% of the mineral powder (c), relative to the total weight of the sum of components (a), (b) and (c).

16. The mineral composition according to claim 3, wherein the graphite powder is an expanded graphite powder.

17. The mineral composition according to claim 3, wherein the graphite powder is a compacted expanded graphite powder.

* * * * *